UNITED STATES PATENT OFFICE.

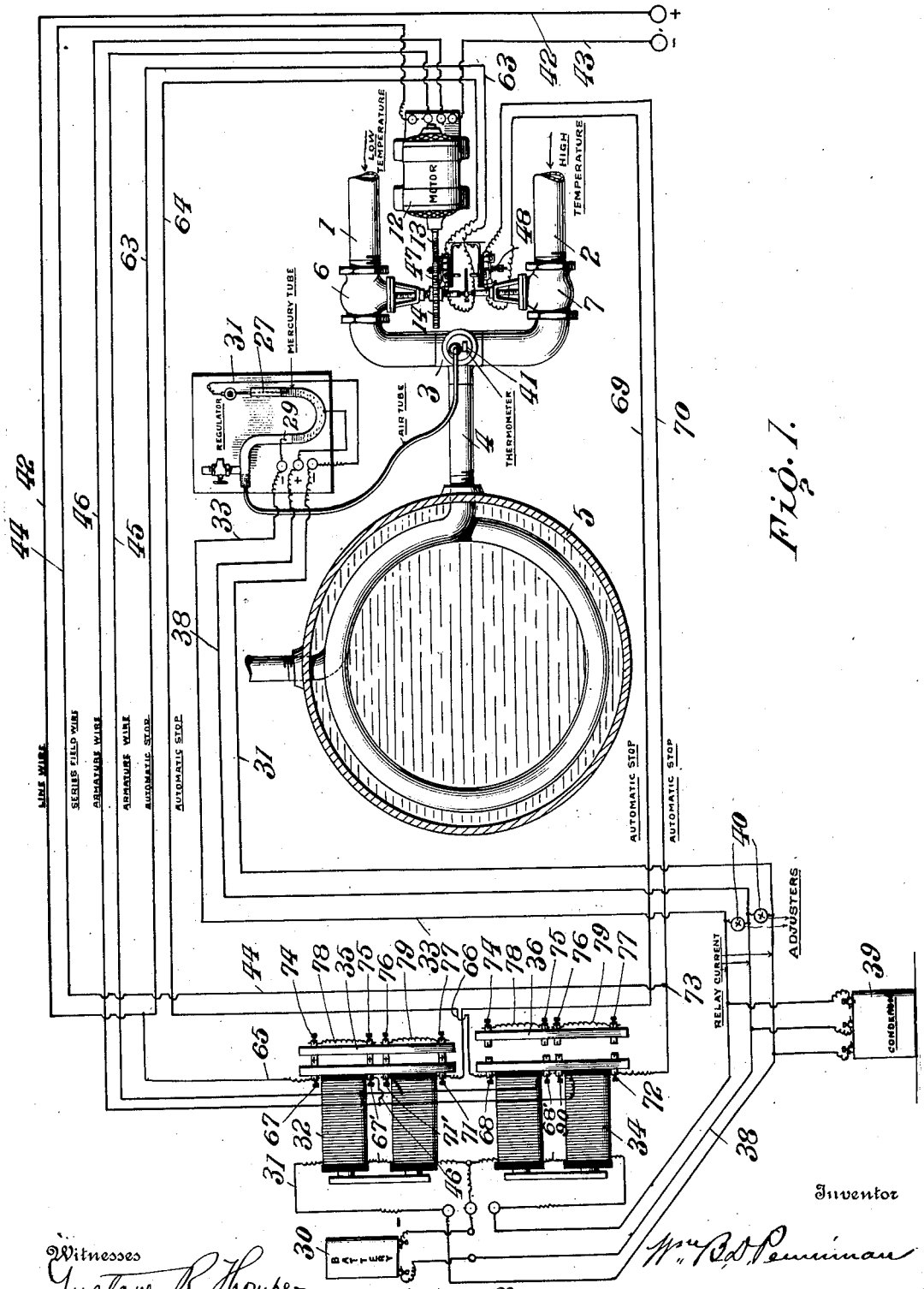

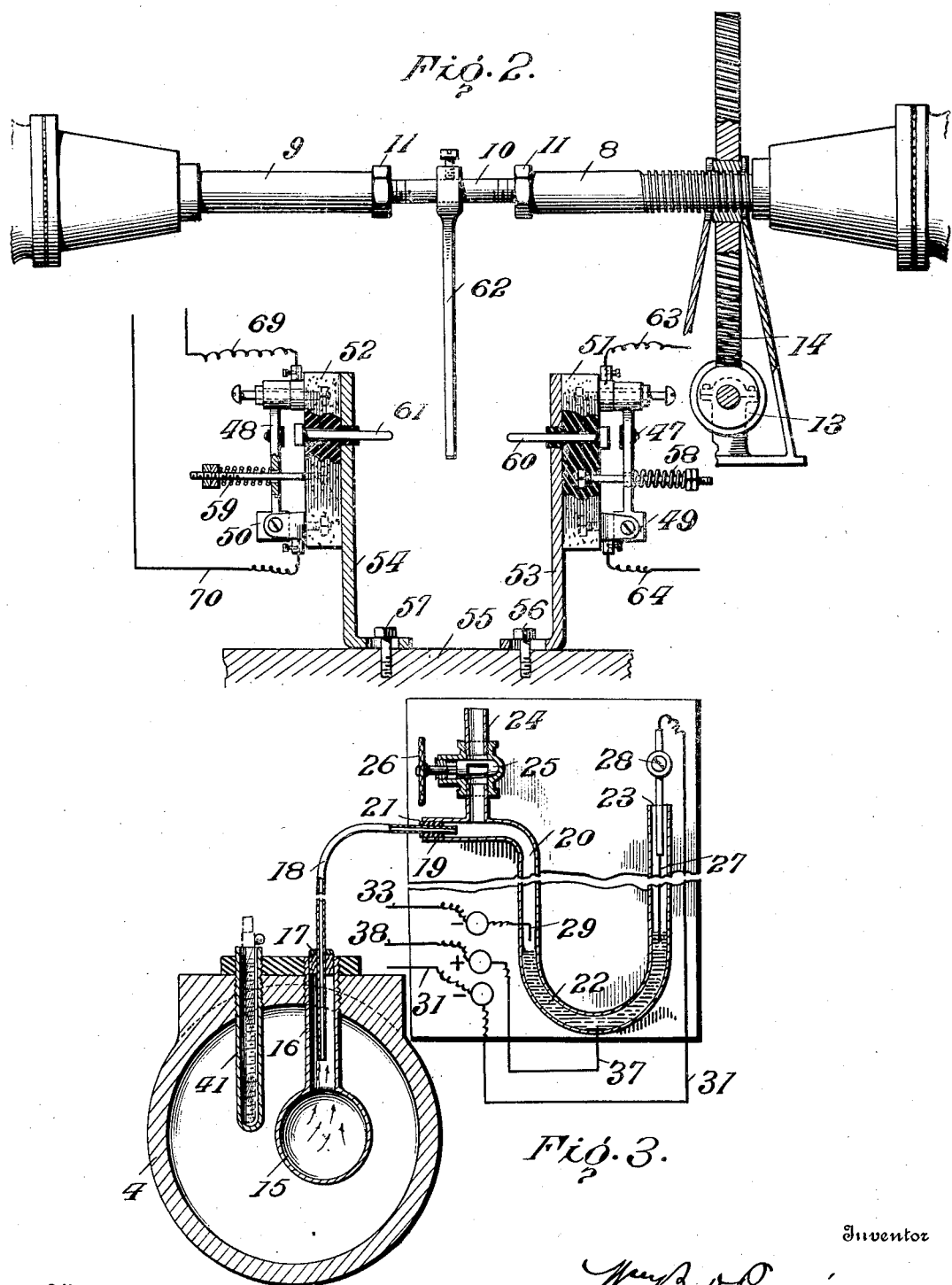

WILLIAM B. D. PENNIMAN, OF BALTIMORE, MARYLAND.

VALVE-CONTROLLING APPARATUS.

No. 902,600.     Specification of Letters Patent.     Patented Nov. 3, 1908.

Application filed June 23, 1905. Serial No. 266,649.

*To all whom it may concern:*

Be it known that I, WILLIAM B. D. PENNIMAN, a resident of Baltimore, Maryland, have invented a new and useful Improvement in Valve-Controlling Apparatus, which invention is fully set forth in the following specification.

This invention relates to the art of regulating temperatures, and more particularly to the regulation of the temperature of a heating or refrigerating medium, such as steam or brine, passing through a conduit in which it is desired the temperature shall be practically uniform.

In my Patent No. 766,841, granted Aug. 9, 1904, I have disclosed a method and apparatus wherein two currents of steam, one of which is superheated and one of which is not, are united in a single current to lower the temperature of the one and raise that of the other, valves being employed to regulate the amounts admitted from the two currents into the united current to the end that the temperature of the united current may be controlled at will by the manipulation of the valves. As shown in said patent, such valves would have to be manually manipulated, and this would render the delicate adjustment of the temperature in the conduit conveying the united currents extremely difficult.

The object of the present invention is to provide automatic means for manipulating the valve mechanism in the high temperature and the low temperature conduits, to the end that exceedingly slight variations in the temperature of the main conduit may be controlled within a very small degree or even the fraction of a degree, if necessary.

Heretofore it has been proposed to unite two currents of a heating medium, such as air, for example, one of the currents being of a high and the other of a low temperature, into a single current, the high and low temperature conduits being automatically controlled by a valve mechanism operated by a suitable motor to throw the valves into open position in one conduit, and closed position in the other, or vice versa, depending upon whether the heating medium in the main conduit was above or below the desired temperature. In devices of this character it has been proposed to employ a thermostat, acted upon by the heating medium in or issuing from the main conduit which should determine the direction of motion of the motor to either open or close the respective valves, as the case might be, and furthermore to provide an automatic switch mechanism to open the circuit, in case an electrical motor is employed, and thereby stop the motor as soon as the respective valves have been opened or closed. Devices thus constructed have operated to control the temperature of the current in the main conduit, but only within wide limits, *i. e.*, the device would act to operate mechanism when very material changes of temperature in the main conduit occurred, but was not sufficiently delicate to effect the operation of the valve mechanism for very slight changes of temperature in the main conduit.

The object of the present invention is to provide means for automatically manipulating the valve mechanism referred to, which shall be so delicate in character that very slight changes in temperature, even as low as a fractional part of a degree, will be sufficient to cause a partial shifting of the valve mechanism so as to slightly increase the amount of fluid passing through one of the conduits, and slightly decrease the amount passing from the other conduit into the main conduit, the extent of the shifting of the valve mechanism being controlled entirely by the extent of the rise or fall of the temperature in the main conduit.

With this object in view the invention consists in a plurality of conduits conducting high and low temperature heating or refrigerating medium into a main conduit, such high and low temperature conduits being provided with valve mechanism for controlling the amount of heating or refrigerating medium flowing therethrough into said main conduit, and a motor for automatically operating said valve mechanism so as to shift the same to any extent necessary to obtain the change in temperature desired, combined with a thermal device actuated by a rise or fall of the temperature in or emanating from the main conduit, said thermal device being so devised and constructed that, during the time when the temperature in or emanating from the main conduit is at the desired degree, it will remain inactive but will instantly respond to minute changes of temperature in or emanating from said main conduit, the whole being so devised and constructed that at the desired temperature in the main conduit the motor shall remain inactive, and upon a rise of the temperature the motor shall be set in operation in one direction to actuate the valve mechanism, and upon a fall of temperature, said motor shall be set in motion in a reverse direction to actuate said valve mechanism, the thermal device acting to cut off the power from the motor at the instant when the temperature in or emanating from the main conduit has reached the desired degree or the degree to which the apparatus is set.

Furthermore, the invention consists in the conduits, valve mechanism, motor and thermal device above mentioned, said device being provided with means whereby it will be caused to remain inactive at any desired degree of temperature in or emanating from the main conduit, but will become instantly active upon the slightest increase or decrease of temperature therein.

In most instances in the operation of the device, the motor will act to either slightly shift the valve mechanism so as to slightly increase the opening in one of the conduits and decrease that in the other, to the end that the proportion of fluid delivered by said conduits into the main conduit may be very slightly varied; but in some cases it may be necessary to have the motor continue operation until the valve mechanism in one conduit is fully closed and that in the other is fully opened, and the invention therefore further consists in providing means whereby the power to the motor, having the thermal control device of the power above indicated, is cut off at the instant when the valve mechanism reaches any desired limit of movement, as when it acts to fully close one of said conduits and fully open the other.

Any desired heating or refrigerating medium may be employed, that chosen for illustration in the present instance being steam, one of the currents of steam being superheated to any desired or necessary degree and the other current being steam of a lower temperature. Moreover, any suitable valve mechanism may be employed, either a plurality of valves, one in each of the two conduits leading into the main conduit, or a single valve mechanism so constructed as to control both conduits. In the present instance a plurality of valves, one in each conduit is shown, said valves being rigidly connected together so as to be operated by a single motor. Furthermore, any suitable motor may be employed for actuating the valve mechanism, that herein chosen for illustration being a series-wound electrical motor.

The invention is illustrated in the accompanying drawings, which drawings, however, are for the purpose of illustration only and not as defining the limits of the invention, reference being had for this purpose to the claims.

In said drawings Figure 1 is a diagrammatic plan view illustrating the invention; Fig. 2 is a view partly in vertical section and partly in elevation, illustrating the automatic stop devices; and Fig. 3 is a vertical sectional view showing the thermo-sensitive means for bringing the relay battery into operation.

Referring to the drawings, in which like numerals indicate like parts, 1 is a conduit for the low temperature current, and 2 is a conduit for the high temperature current, these two conduits 1 and 2 being united at 3 into the main conduit 4, which conduit leads to any suitable place where the heating or refrigerating effect of the medium is to be utilized, here shown as forming a coil in a still 5, shown in section in Fig. 1.

6 is a valve casing in the conduit 1, and 7 a like casing in the conduit 2, in which are located valves for controlling the flow of the fluid through the respective conduits, which valves are connected respectively to valve stems 8 and 9, Fig. 2, said stems being joined by a rod 10 having right and left screw-threads thereon, which screw into suitable sockets in the valve stems 8 and 9, lock nuts 11, 11, being employed to lock the parts in adjusted position. By turning the connecting stem 10 in one direction or the other, the relative distance apart of the two valves in the casings 6 and 7 may be increased or diminished, to the end that when one valve is thrown over so as to be entirely closed the amount of the opening in the other valve casing may be adjusted at will.

12 is a motor of any suitable construction, preferably a series wound electrical motor, whose power shaft 13 is in the form of a worm engaging a worm gear 14, having its hub formed as a nut engaging screw-threads on one of the valve stems, in this instance shown as the valve stem 8, so that the revolutions of the worm gear 14 in one direction will cause the valve stems to move, say from left to right; whereas the revolutions of the worm gear 14 in the other direction will cause the valve stems to move from right to left, thereby shifting the respective valves in the valve casings 6 and 7, and controlling the flow of fluid through the conduits 1 and 2.

It will be observed that the revolutions of the power shaft 13 will be transmitted to the connected valve stems 8 and 9, but the rate of movement will be very greatly reduced by reason of the interposition of the worm wheel 14 and its nut and screw-thread connection with said stem, so that the revolutions of the motor shaft of the motor will act to very slowly shift the valves in either direction, depending upon the direction of movement of the motor.

When the fluid passing through the conduit 4 is at the desired temperature, the motor should not be in operation, since the amount of high and low temperature fluid supplied from the conduits 1 and 2 is then in proper proportions, but should the temperature in or emanating from the main conduit either rise or fall, the motor should be set in operation so as to increase or decrease the amount of high temperature fluid delivered to the conduit 14, and whether the amount of fluid thus delivered will be increased or decreased will depend upon the direction of rotation of the power shaft 13 of the motor.

For the purpose of breaking the circuit to the motor when the temperature in or emanating from the main conduit is at the desired degree, or for passing the current through the motor to cause it to revolve in the proper direction upon the rise or fall of the temperature in or emanating from the main conduit, the following means are employed, viz: Referring to Fig. 3, 15 is an air chamber preferably in the form of an air-bulb of copper or other good conductor of heat, placed in a position to be affected by the temperature in or emanating from the main conduit. As here shown, the air-bulb 15 is let into the conduit 4 through any suitable opening, but it will be readily understood that instead of being located directly in the conduit it might be located within the vessel or chamber or material which the conduit 4 is employed to heat. The stem 16 of the air-bulb has its upper end closed air-tight by any suitable means, as a gasket 17 through which passes a pipe 18, one of whose ends communicates with the inside of the air-bulb 15, the other end of said pipe being connected, as at 19, to one leg 20 of a U-tube composed of glass or other suitable non-conductor of electricity, the point where the pipe 18 enters the leg 20 being closed air-tight, as by a gasket 21. Within the U-tube is a column of mercury 22, one end of said column being exposed to the atmosphere through the open leg 23 of said tube. Adjacent to the gasket 21 on the leg 20 of the U-tube is a conduit 24 leading to the atmosphere, having therein a valve 25 for opening or closing the conduit, which valve is operated by any suitable means, as a wheel 26, whereby the valve may be turned to place the leg 20 of the U-tube in communication with the atmosphere or to entirely close communication, as may be desired.

Supported within the open leg 23 of the U-tube is an electrode 27 which may be adjusted up and down by means of a set-screw 28, and in the other leg 20 of the U-tube is an electrode 29, each of the electrodes 27 and 29 here shown as being connected to the negative side of a battery 30. A wire 31 leads from the electrode 27 to the battery, and on its way forms the coils of an electromagnet 32 interposed between the electrode 27 and the battery 30, while a wire 33 leading from the electrode 29 also leads to the negative side of the battery 30, forming on its way the coils of an electromagnet 34. The armature of the electromagnet 32 is indicated at 35, and that of electromagnet 34 is indicated at 36. The relative positions of the two electrodes 27 and 29 is such that when the mercury in the U-tube 22 stands at an equal height in each leg it will not contact with either of the electrodes, but when it is slightly raised in one leg and slightly lowered in the other, it will make contact with one of the electrodes only, here shown as contacting with the electrode 27. Passing into the U-tube so as to always be in electrical contact with the mercury, no matter what the height of said mercury may be in the legs of the tube, is an electrode 37 which has a wire 38, here shown as leading to the positive side of the battery 30. It will be seen that whenever the mercury in the U-tube 32 is of an equal height in each leg of the tube, the circuit from the battery is broken, but whenever it is raised in either leg it makes contact with one of the electrodes 27 or 29, and the circuit is completed. If it contacts with electrode 27 the electromagnet 32 is energized and its armature 35 is attracted, as shown in Fig. 1, while the electromagnet 34 is inactive or deënergized and its armature 36 is withdrawn by the usual spring, not shown.

For the purpose of adjusting the valves in the casings 6 and 7 at the beginning of the operation so that the proper proportions of fluid shall be delivered from pipes 1 and 2 to obtain the temperature desired in the conduit 4, normally open switches 40 are placed in any suitable position between the wires 38 and 31 on the one hand, and 38 and 33 on the other, push buttons being provided for manually closing these switches. By means of these switches the circuit may be closed from the battery 30 through either of the electromagnets 32 or 34, thereby causing the same to attract its armature and close the switch connected therewith. For example, if the button between the wires 31 and 38 be pushed, it will act to close the circuit between said wires precisely as the circuit is shown to be closed by the mercury in the U-tube in Figs. 1 and 3. This will set the motor in operation to adjust the valve mechanism so as to permit a greater amount of the low temperature and a less amount of the high temperature fluid to pass into conduit 4. On the other hand, if it is desired to adjust the mechanism so as to cause a greater amount of high temperature and a less amount of low temperature fluid to pass into conduit 4, the switch between wires 33 and 38 would be closed.

If desired, a condenser 39 may be connected with the line wires 31, 37 and 38, leading to the battery 30.

Referring to Fig. 3, 41 is a tube inserted in the conduit 4, closed at its inner end and open at its outer end, this tube being designed merely to receive an ordinary or suitable thermometer for taking the temperature of the heating fluid within the conduit 4. The operation of this portion of the device is as follows: A thermometer is inserted in the tube 41 and the valve 25 in the regulator conduit 24 is opened to the atmosphere. Let it be assumed that the position of the valves in casings 6 and 7 is such that the temperature of the fluid in conduit 4 would not rise to the degree desired. It would then be necessary to decrease the amount of low temperature and increase the amount of high temperature fluid delivered to conduit 4, and this could only be accomplished by setting the motor in motion in the direction to open wider the high temperature valve in casing 7, and more nearly close the low temperature valve in casing 6. The operator therefore closes the switch between wires 33 and 38 by pressing the proper button, thereby closing the circuit through electromagnet 34 which, by attracting its armature, closes the circuit for the power coming in over wire 42 through the motor in the proper direction to secure the movement of valve desired, all as hereinafter described. When the temperature in conduit 4 has become high enough, the mercury in the thermometer, located in tube 41, begins to rise and is permitted to rise until the thermometer in the tube 41 indicates the desired temperature in or emanating from the conduit 4. As the temperature rises in the conduit 4, the air in the air bulb 15 is heated and caused to expand, and this expanding air is permitted to escape through the open valve 25 to the atmosphere, without exerting any pressure on the surface of the mercury in the leg 20 of the U-tube. When the desired temperature in or emanating from the conduit 4 is obtained, this will be indicated by the thermometer in the tube 41, and the valve 25 is then closed and any further expansion of the air in the bulb 15 will cause pressure to be exerted upon the mercury in the leg 20 of the U-tube, thereby depressing the mercury in that leg and raising it in the opposite leg, with the result that the mercury will make contact with the electrode 27 and the current from the battery 30 will thus flow through conductor 38, the electrode 37, the mercury, the electrode 27 and the conductor 31 via the electromagnet 32 to the battery. This will energize the electromagnet 32 and cause the armature 35 to be attracted thereby, as shown in Fig. 1, while the electromagnet 34 will be inactive or deënergized and its armature 36 will be withdrawn, as indicated in said figure. These armatures 35 and 36 are employed as switches for regulating the direction of the main current to the motor 12 in a manner to be hereinafter described.

Referring to the diagrammatic drawing of Fig. 1, 42 is a conductor leading from the source of power to the motor and 43 is the return wire. 44 is a wire leading from the series windings of the field of the motor, and 45 and 46 are wires connected to the armature windings of the motor.

Referring to Fig. 2, 47 and 48 are switches pivoted at 49 and 50 to a suitable support from which they are electrically insulated, as by blocks of fiber 51 and 52, which blocks of fiber are carried upon standards 53 and 54 adjustably secured to base 55. As here shown, the standards 53 and 54 are secured to the base 55 by means of screws 56 and 57 passing through slots in the lower end of the standards 53 and 54 to the end that the standards 53 and 54 may be adjusted toward each other and held and retained in the adjusted position by the screws 56 and 57, in a way that will be readily understood. Each of the switches 47 and 48 are normally held in closed position, i. e., in position to permit current to pass, as shown in Fig. 2, by springs 58 and 59 bearing thereon. Mounted in the standards 53 and 54 and passing also through the fiber blocks 51 and 52, and properly insulated from said standards, are pins 60 and 61 which slide freely in their bearings and are in position to impinge upon the switches 47 and 48, and when proper force is applied, to open the respective switches.

Secured so as to move with the valve stems 8 and 9 and preferably to the connecting rod 10, is an adjustable arm 62 normally projecting between the pins 60 and 61 so that said pins are in the line of travel of said arm as the arm is moved from left to right or right to left, depending upon the direction of rotation of the motor shaft. These switches are introduced for the purpose of automatically stopping the motor by breaking the circuit at a time when either of the valves in the casings 6 and 7 reaches a desired limit of movement whether it is fully closed or otherwise, this being brought about by so positioning the arm 62 that just before the valve reaches its desired position the arm 62 will impinge upon either the pin 60 or 61, as the case may be, and force it against the switch 47 or 48, and open the switch just as the valve comes to its partially or fully closed position, as may be desired, and preventing any undue strain upon the parts and consequent burning out of the motor.

Leading from one side of the switch 47 is a conductor 63 and from the other side a conductor 64. The conductor 63 connects and forms one with the line wire 42, and extends through conductor 65 to a pin or binding post 67, while the conductor 64 is connected by branch wire 66 to the pin or post 68, said pins or posts 67 and 68 being carried by suitable supports at the front of the electromagnets 32 and 34, respectively. Leading from the sides of the switch 48 are wires 69 and 70. The wire 69 is connected to the conducting pin 71 of the electromagnet 32 and the wire 70 is connected to the pin 72 of the electromagnet 34, said wire 70 being also connected at 73 to the series field wire 44.

Each of the armatures 35 and 36 carry four electrical conductors or pins 74, 75, 76, 77, which project through the armatures and contact with corresponding electrically conducting pins or posts supported upon the electromagnets, but insulated therefrom, as will be understood from an inspection of Fig. 1. The conducting pins 74 and 75 are connected by a wire 78 and pins 76 and 77 are connected by a wire 79.

The operation of the device as a whole is as follows: Let it be assumed that the operator has opened the valve 25 and has closed the proper switch 40 to cause the temperature in conduit 4 to rise, in the manner above described. When the temperature in or emanating from the conduit 4 rises above the desired degree, the mercury in the U-tube is forced into the position shown in Figs. 1 and 3, thereby making contact with the electrode 27 as previously described, so that the electromagnet 32 is energized and its armature 35 attracted into position to cause the conducting pins 74, 75, 76 and 77 thereon to contact with the corresponding pins supported on the face of the electromagnet 32. The current from the source of power will then pass in over the line wire 42, the wire 65, the conducting pins 67 and 74, the wire 78, the pins 75 and 67', and the armature wire 46, through the armature windings of the motor, back through the armature wire 45, the conducting pins 71' and 76, the wire 79, conducting pins 77 and 71, the automatic stop wire 69, through the switch 48 and the wire 70 to the point 73 where it will pass onto the series field wire 44, to the field of the motor and back to the source of power through the wire 43. This will operate the motor so as to slowly move the valve in the casing 7 towards its closed position and the valve in the casing 6 towards its open position, thereby gradually decreasing the amount of high temperature fluid which is admitted to the conduit 4, and gradually increasing the amount of low temperature fluid passing to said conduit, thus gradually lowering the temperature in the conduit 4 which will immediately result in the cooling of the air in the air bulb 15, and lowering the pressure in the branch 20 of the U-tube, and this will permit the column of mercury in said branch of the tube to rise, while that in the opposite branch falls. This will result in a point being reached where the level of the mercury in the two branches of the tube is the same, thus breaking the circuit from the battery 30 and deënergizing the electromagnet 32, whereupon the armature 35 thereof will be opened and the circuit broken, resulting in the stoppage of the motor. Should the valve in the valve casing 7 reach its desired limit of movement before the mercury in the two legs of the U-tube reaches the same level in both legs of the tube, the arm 62 carried by the united valve stems would impinge upon the pin 61, thereby opening the switch 48 and, since the current to the motor has to pass through this switch, the opening of the same would act to break the circuit and stop the motor. Should the temperature in or emanating from the conduit 4 fall below the desired point, the reverse action would take place, i. e., the mercury in the branch 20 of the U-tube would rise, thereby effecting the energization of the electromagnet 34 and the attraction of its armature so as to close the circuit through said armature and the switch 47 to the motor, but in a reverse direction to that which occurs when the armature 35 of the electromagnet 32 is closed, thereby causing the motor to operate in the reverse direction, i. e., to open wider the valve in the casing 7 and move the valve in the casing 6 towards its closed position.

It will thus be observed that the automatic stop switches 47 and 48 are always closed except when the valve mechanism is thrown to the extreme limit desired in one direction or the other. Moreover, it will be observed that when the valve mechanism is thrown into the position to open the switch 47 switch, 48 is closed and in that case the only direction in which it is desirable to operate the motor is the direction which would require the current to pass in through the automatic stop switch 48 to the motor, and vice versa, when the automatic stop switch 48 is open the parts would be in the position in which it would be desirable to operate the motor so as to move the valve mechanism in the direction of the switch 47, which switch would at that time be closed so as to permit the current to pass therethrough to the motor. Furthermore, in case the valve mechanism is in such position that the arm 62 does not contact with either the pins 60 or 61, and therefore does not act to open either of the switches 47 or 48, both of said switches are closed and current may be passed through either one to the motor, depending upon whether the temperature in the main conduit has risen above or fallen below the desired degree, and whether it is desirable to operate the motor in one direction or the other.

It will also be understood that while the automatic stop switches 47 and 48 are, for the purpose of illustrating the invention, here shown as interposed in the main circuit leading from the source of power to the motor, they might with equal efficiency be interposed in the relay circuit, in which latter case when the motor actuates either of the stop switches 47 or 48 it would break the circuit from the relay battery 30 through the electromagnets 32 or 34, as the case might be, and thereby permit the armatures of said magnets to be withdrawn and thus break the circuit leading from the source of power to the motor. Either one of these positions for the automatic stop switches 47, 48 is the equivalent of the other and would be within the spirit of the present invention.

It will be understood that by means of the regulator valve 25 in the exit nozzle of the U-tube, it is possible to provide that the mercury in the two legs of the U-tube shall stand at a common level at any desired temperature, above which the mercury in the branch 20 of the U-tube will be caused to fall, and rise in the opposite leg of the tube, and below which the mercury will be caused to rise in the leg 20 and fall in the opposite leg of the U-tube, thereby placing it within the power of the operator to determine precisely the temperature which shall be constantly maintained in or emanating from the conduit 4. By actual operations of the device it has been ascertained that the same may be so delicately adjusted that the temperature in the conduit 4 will at no time vary more than a fraction of one degree.

While in the present instance the air-bulb 15 is shown as located directly within the main conduit 4, it will of course be understood that it will be an entirely equivalent construction to place such air-bulb or equivalent device within the chamber or material whose temperature the fluid in conduit 4 is designed to control. For example, in the present instance the air-bulb 15 might, instead of being located directly in the conduit 4, be suspended within the liquid contained in the still 5, so that the valves of the high and low temperature conduits 1 and 2 would be shifted at any time when the temperature of the material in the still varied from the particular degree of temperature to which the device is set.

While, for the purpose of describing the invention, we have referred to the high and low temperature conduits as being supplied, the one with superheated steam and the other with steam of a lower temperature, it must not be understood that the invention is limited to the use of heating fluid, since the fluids passing through the conduits 1 and 2 and into conduit 4 may be refrigerating fluids instead of fluids designed solely for the purpose of heating or raising the temperature in said conduit. For example, suppose it be desired to pass a refrigerating fluid through conduit 4, which refrigerating fluid should be maintained at a constant temperature, it being desired that it should neither rise above nor fall below a predetermined degree; the invention would be as readily applicable to an operation of this kind as it would be in the case described herein where the medium passing through pipe 4 is a heating medium designed to raise the temperature of the chamber into which it passes. In other words, without regard to whether the object is that of raising or lowering the temperature as, for example, in distillation or refrigeration, the invention is equally applicable wherever it is desired to maintain a constant temperature in the medium or fluid passing through conduit 4.

While the conduits 1 and 2 are herein referred to as "high" and "low" temperature conduits, it must be understood that these expressions are merely relative, and indicate that the temperature of one is above that desired in conduit 4, and the temperature of the other is below that desired in said conduit, and is not meant as indicating that the temperature in one is higher than atmospheric temperature, or that the other is lower than such temperature.

What is claimed is:

1. In an apparatus of the character described, the combination of a main conduit, a high temperature and a low temperature conduit emptying into said main conduit, valve mechanism controlling said high and low temperature conduits, a motor for operating said valve mechanism in both the opening and closing directions, means admitting power to said motor to operate it in either direction, a fluid pressure device exposed to the temperature in or emanating from said main conduit and operating said means, and means adjusting said pressure device to render it inoperative at any desired temperature in or emanating from the main conduit.

2. In an apparatus of the character described, the combination of a main conduit, a high temperature and a low temperature conduit emptying into said main conduit, valve mechanism controlling said high and low temperature conduits, a motor for operating said valve mechanism in both the opening and closing directions, means controlling the direction in which power is admitted to said motor, a device rendering said means inoperative at any desired degree of temperature in or emanating from the main conduit, and means for adjusting said device to operate at any desired temperature.

3. In an apparatus of the character described, the combination of a main conduit, a high temperature and a low temperature conduit emptying into said main conduit, valve mechanism controlling said high and low temperature conduits, an electrical motor for operating said valve mechanism in both the opening and closing directions, normally open switch mechanism for controlling the direction of the current through said motor, and means controlling the opening and closing of said switch mechanism on variations from a predetermined temperature in or emanating from the main conduit.

4. In an apparatus of the character described, the combination of a main conduit, a high temperature and a low temperature conduit emptying into said main conduit, valve mechanism controlling said high and low temperature conduits, an electrical motor for operating said valve mechanism in both the opening and closing directions, normally open switch mechanism for controlling the direction of the current through said motor, a source of power for operating said switch mechanism, and means cutting off said source of power from said switch mechanism at any desired temperature in or emanating from the main conduit, but admitting said power on variations above or below said temperature.

5. In an apparatus of the character described, the combination of the main conduit, the high and low temperature conduits communicating therewith, valve mechanism controlling said communication, an electric motor capable of operating said valve mechanism in either direction, lines conducting current to said motor, a plurality of normally open switches in said lines, a thermal device subject to the temperature in or emanating from said main conduit, and a power device thrown into operation by said thermal device to close one of said switches when the temperature in or emanating from the main conduit rises above a predetermined degree and to close the other switch when the said temperature falls below said degree.

6. In an apparatus of the character described, the combination of the main conduit, the high and the low temperature conduits communicating therewith, valve mechanism controlling said communications, an electric motor capable of operating said valve mechanism in either direction, lines conducting current to said motor, a plurality of normally open switches in said lines, a relay battery circuit, electromagnets in said circuit one for each switch, a thermal device in said circuit and operating to break the circuit at a predetermined temperature in or emanating from the main conduit, and means in connection with said thermal device whereby said circuit is closed through one electromagnet on a rise of said temperature and through the other electromagnet on a fall of said temperature below said predetermined point.

7. In an apparatus of the character described, the combination of the main conduit, the high and the low temperature conduits communicating therewith, valve mechanism controlling said communication, an electric motor capable of operating said valve mechanism in either direction, lines conducting current to said motor, a plurality of normally open switches in said lines, a relay battery circuit, electromagnets in said circuit one for each switch, a U-tube in said circuit, a line from each leg of the U-tube each line leading via one electromagnet to the same side of the battery, a third line leading from said U-tube to the other side of the battery, a column of mercury in said tube in permanent contact with said last line but normally out of contact with the other two, and a closed air column exposed to the temperature in or emanating from the main conduit and acting on one end of said mercury column.

8. The combination of the main conduit, and the high and low temperature conduits connected therewith, the valve mechanism for said high and low temperature conduits, the electrical motor operatively connected to said valve mechanism, the electrical conductor leading to said motor, the two normally open switches in said conductor, the relay battery circuit to close said switches, the U-tube in the relay circuit, the electrodes in each leg of said tube and both connected to one side of said battery, a column of mercury in said tube between said electrodes, a third electrode in said mercury and leading to the other side of said battery, the closed column of air bearing on one end of said mercury column, and means subjecting said air column to the temperature in or emanating from said main conduit.

9. The main conduit and the oppositely disposed high and low temperature conduits connected therewith, combined with the valves in said high and low temperature conduits, means for adjusting said valves towards and from each other, a motor for operating said valves in either direction, and motor-starting and stopping devices controlled by the temperature in or emanating from the main conduit.

10. The main conduit and the oppositely disposed high and low temperature conduits connected therewith, combined with the valves in said high and low temperature conduits, means for adjusting said valves towards and from each other, an electrical motor for operating said valves in either direction, two normally open switches controlling the passage of the current and its direction through said motor, means for closing each of said switches separately, and a thermal device controlling the means for opening and closing of said switches.

11. The combination of the main conduit and the high and low temperature conduits connected therewith, the two adjustably connected valves in said conduits, the electrical motor for operating said valves, the two normally open switches in the motor circuit, the relay battery and electromagnets for separately closing said switches, the mercury U-tube in the relay battery circuit having one closed and one open leg with a vent in said closed leg, the valve for controlling said vent, and the air column connected to said closed leg and exposed to the heat in or emanating from said main conduit.

12. The combination of the main conduit and the high and low temperature conduits connected therewith, the two valves one in each of the high and low temperature conduits, the valve stems adjustably connecting said valves, the electrical motor having reduced motion connection with said valve stems, the electro-thermal device controlling the passage of current to and its direction through said motor, means subjecting said device to the heat in or emanating from the main conduit, a pair of oppositely disposed switches in the motor circuit, and means on the valve stems acting to open one of said switches at a predetermined limit of the valve throw.

13. The combination of the main conduit, and the high and low temperature conduits communicating therewith, with the valve mechanism controlling said high and low temperature conduits, an electrical motor for operating said valve mechanism, normally open switch mechanism controlling the passage of the current through said motor, and a thermal device and a manually operated switch each controlling the opening and closing of said switch mechanism.

14. The combination of the main conduit, and the high and low temperature conduits communicating therewith, with the valve mechanism controlling said high and low temperature conduits, an electrical motor for operating said valve mechanism, an electric circuit for said motor, normally open switch mechanism in said circuit controlling the passage of the current through said motor, a separate electric circuit, an electromagnet therein controlling the opening and closing of said switch mechanism, and means controlling the passage of current through said magnet.

15. The combination of the main conduit, and the high and low temperature conduits communicating therewith, with the valve mechanism controlling said high and low temperature conduits, an electrical motor for operating said valve mechanism, an electric circuit for said motor, normally open switch mechanism in said circuit controlling the passage of the current through said motor, a separate electric circuit, an electromagnet therein controlling the opening and closing of said switch mechanism, and automatically operated means controlling the passage of current through said magnet.

16. The combination of the main conduit, and the high and low temperature conduits communicating therewith, with the valve mechanism controlling said high and low temperature conduits, an electrical motor for opreating said valve mechanism, normally open switch mechanism controlling the passage of the current through said motor, an electromagnet controlling the opening and closing of said switch mechanism, and a manually operated switch controlling the passage of current through said magnet.

17. The combination of the main conduit, and the high and low temperature conduits communicating therewith, with the valve mechanism controlling said high and low temperature conduits, an electrical motor for operating said valve mechanism normally open switch mechanism controlling the passage of the current through said motor, an electromagnet controlling the opening and closing of said switch mechanism, and a manually operated switch and automatically operated means controlling the passage of current through said magnet.

18. The combination of the main conduit, and the high and low temperature conduits communicating therewith, with the valve mechanism controlling said high and low temperature conduits, an electrical motor for operating said valve mechanism, normally open switch mechanism controlling the passage of the current through said motor, electrical devices for operating said switch mechanism, a manually operated switch controlling the passage of current to said electrical devices, and a thermal device exposed to the temperature in or emanating from the main conduit said thermal device automatically controlling the passage of current to said electrical devices.

19. In an apparatus of the character described, the combination of a main conduit, a high temperature and a low temperature conduit emptying into said main conduit, valves in the high and low temperature conduits, electromagnetic valve operating means on a normally open circuit in operative relation with said valves, and a normally open electromagnetic circuit subject to closing by fluctuations of temperature in the main conduit for closing the first-named circuit.

In testimony whereof I have signed this specification in the presence of two subscribing witnesses.

WILLIAM B. D. PENNIMAN.

Witnesses:
BERTRAM BERNARD,
FRANCIS T. HOMER.